No Printed Specification Available
9001X
J. Parker,
Roofing Tile,
Patented Aug. 15, 1835
Fig. 8.
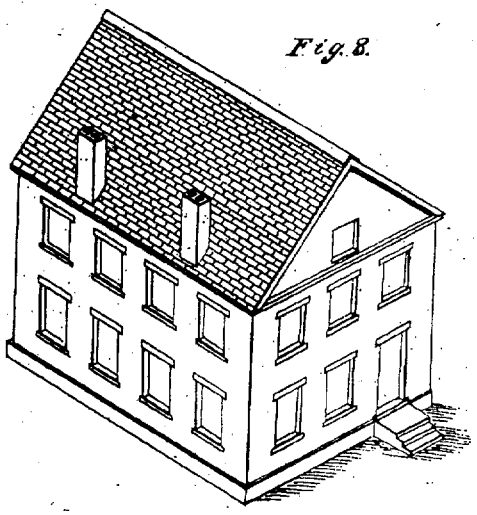
Fig. 1.
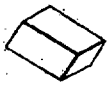
Fig. 2.
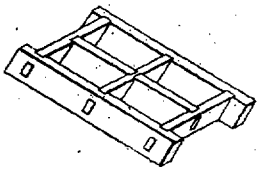
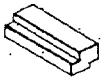

Aug. 15. 1835 9001X 65.

James Parker of Gardiner Maine

Letters Patent

The Schedule referred to in these Letters Patent and making part of the same containing a description in the words of the said James Parker himself of his improvement in the form or shape of Bricks for the Roofs of Buildings & in the mould for striking said Bricks To all to whom these presents shall come: Be it known that I James Parker of Gardiner in the County of Kennebec & State of Maine have invented a new and useful improvement in the form or shape of bricks for the roofs of buildings, and in the moulds for striking and the manner of making said bricks, and the following is a full and exact description of my said improvement. The accompanying drawings make a part of this Specification and are referred to. Fig 1. represents the peculiar form of the bricks which is rhomboidal. The bricks may be of any convenient size, but the ordinary dimensions are eight inches long, four inches wide, and two inches thick. It will be seen by the brick shown at A. Fig. 1. that two of its angles are obtuse; and two of them acute; when a roof is covered with bricks made in this shape, it presents a smooth and even surface forming an inclined plane while the bricks being placed horizontally one above the other do not admit water, or suffer the roof to leak. These bricks are to be laid in mortar cement, upon lathe boards or upon smooth boards, if they should be thought preferable. The edges of the bricks will present a plane more or less inclined; corresponding to the inclination of the roof, and the mould in which they are cast must vary accordingly. Fig 3. represents a roof covered with these bricks which is smooth compact, light; and impervious to water, and may be pronounced perfectly fire and water proof. The surface of the Roof may be covered with cement or paint, at the option or pleasure of the proprietor. Fig 2. represents the peculiar form of the mould; the side pieces of which are inclined in the same degree that the edges of the bricks are, and the end pieces are made in the usual manner except that their extremities are made to match the sides

9001X pieces as shown in the drawing. The mortar is put into the mould in the usual manner while the mould rests upon the table. The table may be an inclined plain, or the table upon which the mould is inverted when the bricks are removed from the mould, should be inclined. I claim as new and of my own invention: the peculiar form of the bricks and of the mould in which they are to be made; and the application of bricks to this purpose in the manner described in this Specification Witnesses
J. Young Scammon
Jesse Aiken James Parker (Patented August 15. 1835)

494 words (Drawing)